United States Patent [19]

Berger et al.

[11] Patent Number: 4,827,417

[45] Date of Patent: May 2, 1989

[54] CONTROL METHOD FOR OPTIMIZING EXPLOITATION COSTS OF AN ENGINE AERODYNE SUCH AS AIRCRAFT IN THE CLIMB PHASE

[75] Inventors: Dominique Berger; Vincent Rivron, both of Toulouse, France

[73] Assignee: Aerospatiale Societe Nationale Industrielle, Paris, France

[21] Appl. No.: 773,813

[22] Filed: Sep. 9, 1985

[30] Foreign Application Priority Data

Sep. 10, 1984 [FR] France .................... 84 13836

[51] Int. Cl.$^4$ .................... G06F 15/50; G05D 1/06
[52] U.S. Cl. .................... 364/433; 364/442; 244/182
[58] Field of Search .................... 364/433, 442, 431.07, 364/427–428; 244/180, 182; 73/178 T

[56] References Cited

U.S. PATENT DOCUMENTS

| | | | |
|---|---|---|---|
| 3,958,107 | 5/1976 | Edelson et al. | 364/442 |
| 4,038,526 | 7/1977 | Eccles et al. | 364/442 |
| 4,063,072 | 12/1977 | Sochtig et al. | 364/431 |
| 4,127,248 | 11/1978 | Boone et al. | 364/433 |
| 4,159,088 | 6/1979 | Cosley | 244/182 |
| 4,312,041 | 1/1982 | De Jonge | 364/442 |
| 4,325,123 | 4/1982 | Graham et al. | 364/431.07 |
| 4,326,253 | 6/1982 | Cooper et al. | 364/435 |
| 4,347,572 | 8/1982 | Berwick, Jr. et al. | 364/433 |
| 4,357,663 | 11/1982 | Robbins et al. | 364/433 |
| 4,445,179 | 4/1984 | Michelotti | 364/431.07 |
| 4,577,275 | 3/1986 | Adams et al. | 364/433 |

FOREIGN PATENT DOCUMENTS 2027227 2/1980 United Kingdom .

OTHER PUBLICATIONS

Stengel et al., "Energy Management for Fuel Conservation in Transport Aircraft", pp. 464–470, IEEE Transactions on Aerospace and Electronic Systems, vol. AES, No. 4, Jul. 1976.

Farmer, "Delco Electronics Flight Management System for Air Force C-141 Aircraft", IEEE Aerospace and Electronics Conference, Dayton, Ohio, May 1980, pp. 191–198.

Primary Examiner—Parshotam S. Lall
Assistant Examiner—Thomas G. Black
Attorney, Agent, or Firm—Browdy & Neimark

[57] ABSTRACT

There is proposed a method of controlling an engine aerodyne in the climb phase, wherein a velocity variation law as a function of altitude is imposed. Moreover, there is set a law of variation of the engine speed corresponding generally to progerssive decrease in such speed as altitude increases. Optimization of exploitation costs in the climb phase can be reached mainly by taking into account the engine maintenance costs by means of a wear model.

7 Claims, 4 Drawing Sheets

CONTROL METHOD FOR OPTIMIZING EXPLOITATION COSTS OF AN ENGINE AERODYNE SUCH AS AIRCRAFT IN THE CLIMB PHASE

This invention relates to a method of controlling (or piloting) an engine aerodyne in the climb phase to permit reduction of the exploitation costs of such aerodyne. This aerodyne is generally an aircraft.

As is well known, control or piloting of an aircraft is bound to a combination of actions upon the aircraft engine speed through the intermediary of a device currently called "throttle lever" and upon the aircraft attitude relative to ground through a device currently called "control lever". In practice, in the climb phase, i.e. after the take off phase, (up to an altitude of about 300 meters or 1500 feet, for example) but before positioning the aircraft to its cruising altitude, the engine speed of the aircraft is set to a constant value lower than or equal to a threshold engine speed called "maximum climb engine speed" which as indicated by engine manufacturers should not be exceeded in climb except in case of emergency to prevent redhibitory wear of the engine(s) considered. The engine speed being imposed, any optimization of the exploitation costs of the aircraft is exclusively obtained by acting upon the control lever, i.e. the speed or velocity of the aircraft up to its cruising altitude. In practice, and in a simplified manner, it is recommended to the pilots to control their aircraft in the climb phase so as to keep on a predetermined velocity value and then starting from a Mach number threshold, to keep on the latter value. Such velocity can be for example the trajectory velocity.

In fact, noise considerations sometimes require that the engine speed should be momentaneously reduced at the beginning of the climb (see U.S. Pat. No. 4,019,702).

Many attempts at optimizing the exploitation costs of an aircraft in flight have already been proposed, mainly in U.S. Pat. Nos. 4,038,526, 4,159,088, 4,326,253, 4,347,572, and 4,445,179, or else French Pat. No. 2,435,090. These documents mainly take into account, in their exploitation costs fuel consumption, and sometimes, in the climb phase, the duration of the climb.

The object of this invention is a more pronounced optimization of such exploitation costs by identifying more completely than in the past the various elements which participate therein.

It is thus proposed according to this invention a method of controlling an engine aircraft in the climb phase according to which a law of speed or velocity variation as a a function of the altitude is imposed, and characterized in that there is also imposed a law of variation of the engine speed which generally corresponds to progressive decrease of such engine speed as altitude increases.

In fact, it is taught according to the invention that the progressive decrease of the engine speed should occur preferably from a speed value substantially higher than the maximum climb rating, which is opposed to recommendations from engine manufacturers. According to an advantageous proposal of this invention, the law of decrease of the engine speed as a function of the altitude and the law of variation of the velocity as a function of the altitude are defined by optimization of exploitation costs taking into account the costs of the engine fuel, the climb duration as well as the engine maintenance costs; the latter costs are related to the instantaneous wear of the engine which increases as the engine speed increases. A relationship between the instantaneous costs of maintenance (associated with an instantaneous damage) and the engine speed can be approximately evaluated for example from the simplified empirical relationship used by airline companies to evaluate the maintenance costs associated with a flight between two airports.

It is to be noted that the engine speed more or less influences both the duration of the climb, the fuel consumption and the maintenance costs, so that it is interesting to define an optimum law of variation of such engine speed.

Other objects, characteristics and advantages of this invention will appear from the following description which is given by way of non limitative example with reference to the attached drawings in which:

FIG. 1 illustrates the principle of calculation employed according to the invention to minimize the exploitation costs during the climb phase of an aircraft by varying both of the control parameters which are the velocity and the engine speed and taking into account variations in time T, consumption C and engine maintenance costs M, which depend on such parameters.

A computer determines once or several times during the climb from the initial laws $V_i(z)$ and $R_i(z)$, by means of a suitable optimization algorithm, laws $V_2(z)$ and $R_2(z)$ which lead to a minimum climb cost to reach given cruising conditions (the climbings are compared at equal distances travelled).

The computer, before each computation, can update the previsions of evolution of the external parameters with altitude (temperature, pressure ...), as well as the airline control requirements or else, can taken into account the actual parameters of the aircraft behaviour.

An engine speed law $R(z)$, first equal to $R_i(z)$, is a control parameter for a simulation model of the aircraft behaviour called "aircraft model" and schematized by a block 5, on the one hand, and on the other hand, intervenes in the maintenance costs M after being taken into account by a damage model schematized at 6.

A velocity law $V(z)$, first equal to $V_i(z)$, is a second control parameter for the aircraft model 5, which moreover takes into account external parameters related to the local conditions such as the ambient pressure Pa and the ambient temperature Ta.

The model 6 which in practice determines the integral for the residual climb duration of a damage function E discussed later on evaluates the maintenance costs M, whereas the aircraft model 5 determines the consumption C and flight duration T costs.

The overall climb costs are defined at 10 by the sum C+T+M. A variational method of the conventional type schematized by the block 11 determines functions of correction of the velocity V(z) and the engine speed R(z) adapted to minimize the costs C+T+M associated with the residual portion of the climb.

Such correction functions V(z) and R(z) are respectively added to the values Ri(z) and Vi(z) and the computation starts again with improved versions of laws V(z) and R(z). After a certain number of loops the new correction functions are negligible, which corresponds to optimal laws V2(z) and R2(z), giving a minimum cost (C+T+M) min.

Figure 2:
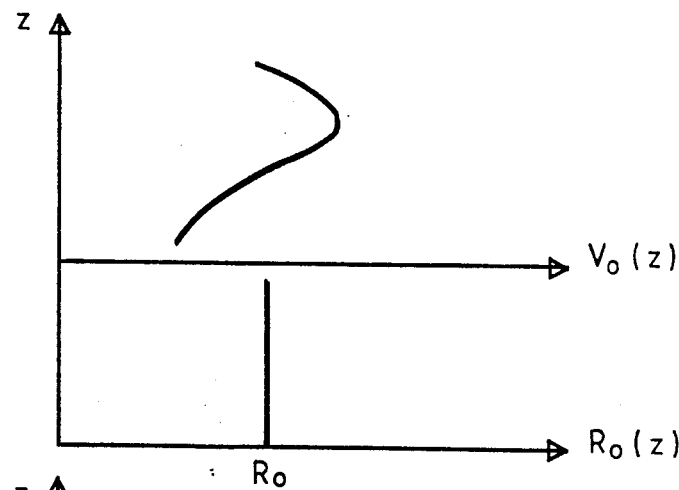
FIG. 2 is a graph showing the development of optimum laws of variation $V_o(z)$ and $R_o(z)$ according to the prior art.

FIG. 2 shows the development of the optimum laws Vo(z) and Ro(z) recommended in the prior art: Vo(z) increases and then decreases with altitude whereas Ro(z) remains constant at a value at most equal to the maximum climb speed Ro.

Figure 3:
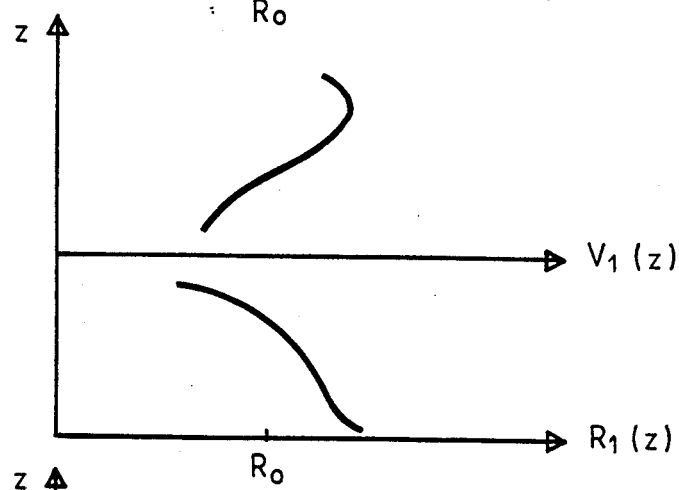
FIG. 3 is a graph showing the development of optimum laws of variations $V_1(z)$ and $R_1(z)$ determined by optimizing the sum of the fuel costs and the costs associated with the flight duration.

FIG. 3 shows optimum laws V1(z) and R1(z) of velocity and speed corresponding to an optimization of the sum C+T, without taking into account M. Practically, an arbitrary maximum threshold is imposed upon M; there results a law R1(z) corresponding to progressive decrease as a function of altitude z from a value generally higher than the maximum climb speed Ro.

Figure 1:
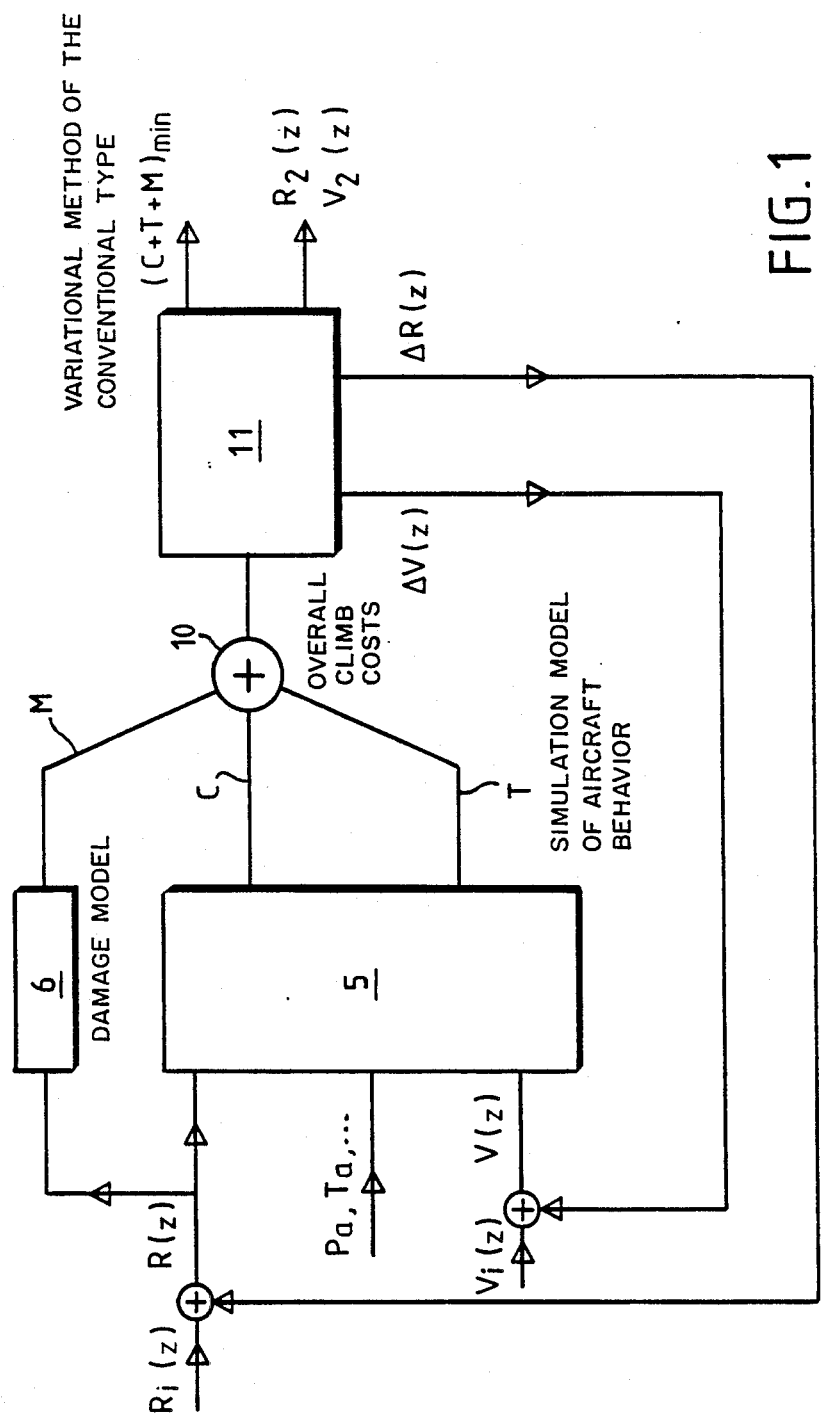
FIG. 1 is a diagram illustrating the complete method of optimization of the laws of variation of the velocity $V(z)$ and the engine speed $R(z)$ of a climbing aircraft as a function of altitude $z$.
Figure 4:
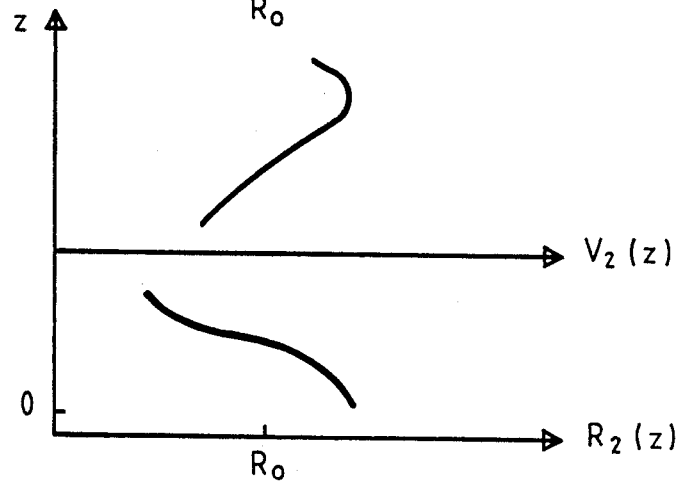
FIG. 4 is a graph showing the development of optimum laws of variation $V_2(z)$ and $R_2(z)$ determined by minimizing the sum of the fuel costs, the costs associated with the flight duration and the engine maintenance costs.

FIG. 4 shows the development of maximum laws R2(z) and V2(z) defined by a block diagram of the type illustrated in FIG. 1.

It is to be noted that FIGS. 2 to 4 show overall behaviors, airline control requirements at the beginning and the end of the climb possibly necessitating adaptation of such laws; then there remains for R(z) in FIGS. 3 and 4 such a curve which in the whole decreases progressively and continuously.

Figure 5:
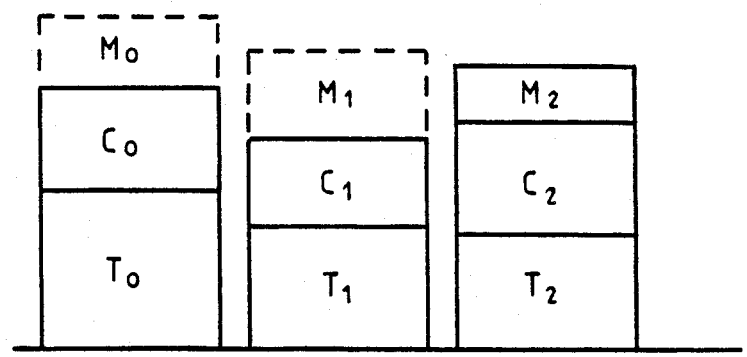
FIG. 5 is a schematic diagram showing in detail the exploitation costs associated with the laws mentioned in FIGS. 2, 3 and 4.

FIG. 5 compares the exploitation costs corresponding to the laws mentioned in FIGS. 2, 3 and 4. The left hand portion of such diagram represents an overall cost equal to the sum of costs To, Co and Mo, the latter cost schematized by a dotted line block not being taken into account upon optimization of Vo(z). The central section of FIG. 5 shows an overall cost equal to the sum of costs T1, C1 and M1, the latter cost schematized by a dotted line block not being taken into account upon determination of the optimum laws V1(z) and R1(z). It is to be noted that cost M1, corresponding to a variable engine speed, is generally higher than cost Mo associated with a constant speed Ro(z) lower than, or equal to, the maximum climb engine speed Ro; the gain obtained by laws V1(z) and R1(z), equal to the difference:

(To+Co+Mo)−(T1+C1+M1) is therefore generally lower than the difference (To+CO)−(T1+C1). The right hand portion of FIG. 5 represents an overall cost, equal to the optimized sum, due to laws V2(z) and R2(z) of costs, C2, T2 and M2. This sum is lower than the sum C1+T1+M1.

The taking into account of the engine wear to deduce therefrom its influence upon the maintenance cost M can be obtained by assuming very realistically that a function E exists, which gives the instantaneous influence of the engine speed upon the state thereof. This permits definition of a maintenance cost through integration as a function of time over an interval corresponding to the climb duration or a residual climb duration:

$$M = \frac{E(z, \theta, Ri, Ri^*, \text{others})\, dt}{\text{climb duration}}$$

in which:
- M is the engine maintenance cost,
- z is altitude,
- $\theta$ the temperature as a function of altitude,
- Ri are the operating parameters of engine speed: speeds, internal temperatures,
- Ri° are time derivatives of the R1's,
- "others" are the other parameters measured during the flight: ground velocity, proper velocity.
- E is a "damage" function characterizing the engine wear under the flight operating conditions: temperature, altitude including variation thereof with time.

The variations of such value E as a function of the various parameters which intervene are in practice to be deduced from information provided by engine manufacturers.

In the absence thereof, a simplified determination of variations of E with the engine speed by neglecting in a first approximation the other parameters can be defined from a schematic empirical method used by the airline companies to evaluate the maintenance cost for a flight, such as the so called method "EURAC DOC" (Direct Operating Cost) which expresses the maintenance cost for a flight as a function of its duration and the average equivalent untaring, such notion integrating influences of constant untarings upon the different flight phases: take off, climb, cruising. Some hypotheses are to be made regarding the profile of the typical mission mentioned in the EURAC method in order to isolate the portion representing the climb itself from the overall maintenance cost.

(1) Cost=A*[CY(B, T, tvol, $\overline{D}$)+tv*FH(B, T, tvol, $\overline{D}$)]

A=constant
B=engine dilution rate
T=net maximum ground thrust
tv=flight duration
$\overline{D}$=untaring
CY and FH=functions.

On a given mission profile it permits to take into account the flight duration, any engine size effects and the average speeds of use per each flight phase (take off, climb, cruising). The untaring $\overline{D}$ represents the average percentage of the selected engine speed relative to the maximum speed admitted by motorists in each of the phases.

By assuming a damage function E (speed) representing the primitive function of the cost, the maintenance cost of the various phases can similarly be modelized as follows:

$$= \frac{E(\text{take off})dt}{\text{take off}} + \frac{E(\text{climb})dt}{\text{climb}} + \frac{E(\text{cruising})dt}{\text{cruising}}$$

or else, if the engine speeds are maintained constant per phase:

(2) Cost=Ed(a+td)+Emtm+Ectc
d=take off index
m=climb index c=cruising index.

The term "a" introduces the concept of thermal shock in the take off as required for validation of the model.

Figure 6:
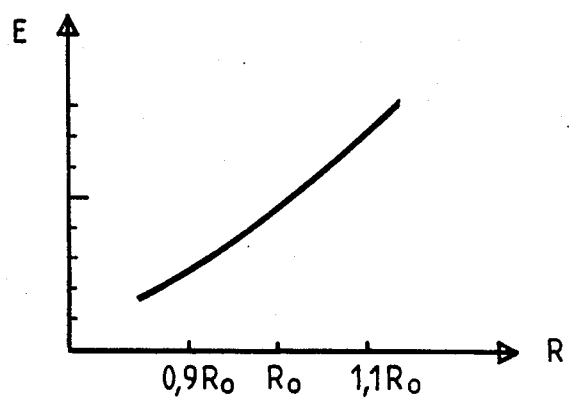
FIG. 6 is a graph showing an example of the correlation between the damage E to an engine as the function of the speed R thereof.
Figure 7:
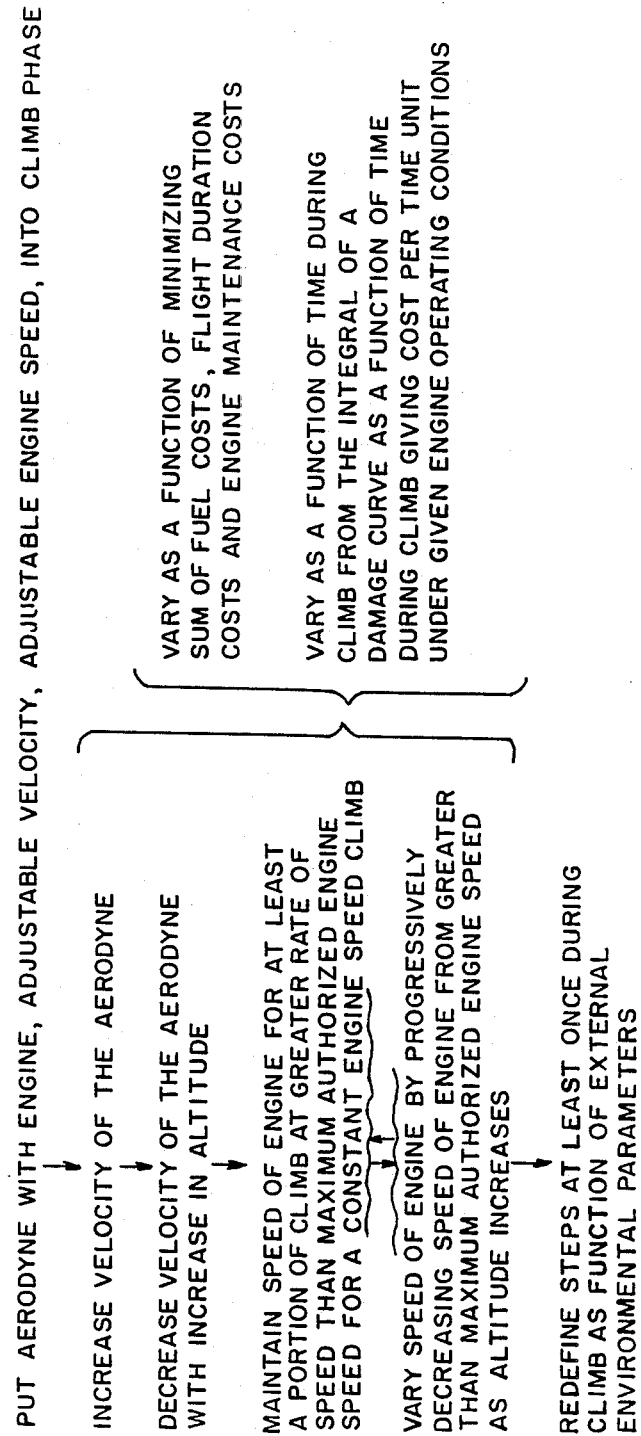
FIG. 7 is a flow diagram of the method of the present invention.

Assuming the following mission profile:
td=1.5 minutes
tm=17 minutes
tc=tv−39.5 minutes,
the bringing closer of the formulations (1) and (2) for different combinations of untaring per phase permits construction of the curve E (engine speed) of FIG. 6.

Optimization of the overall cost may lead in the case of FIG. 4 to a decrease in the engine speed R in the order of several tens of percentage points, for example from 1.15 Ro, if Ro is the maximum climb speed, up to 0.8 Ro, at the end of the climb. In the example of FIG. 4 it can be noted that the speed R remains higher than Ro beyond the first half of the final altitude.

It has been possible to note that a simple rough optimization of V(z) and R(z) according to the above given indications concerning E(R) already leads to a true though modest reduction (of more than 10 dollars per each climb).

It will be understood that the preceding description was only proposed by way of indication and not limitatively and that many variations can be proposed by the man of the art without departing from the scope of the invention. Optimum laws of velocity and speed can be established for the whole duration of a climb phase. It is however preferable to redetermine such laws at least once during the climb as a function of the real operating parameters of the aircraft under the determined conditions.

In practice, optimum laws of velocity and engine speed are interpreted by an automatic aircraft piloting device (automatic pilot) which deduces therefrom control signals to be supplied to the engine(s) and the aircraft controls so as to best follow these laws as a function of altitude (shown by the altimeter).

What is claimed is:

1. A method of piloting an aerodyne with an engine, in the climb phase, with the aerodyne having means to adjust the velocity of the aerodyne and the speed of the engine comprising the steps of
   varying the velocity of the aerodyne in accordance with the increase in altitude of the aerodyne;
   maintaining the speed of the engine for at least a portion of the climb at a greater rate of speed than the maximum authorized engine speed for a constant engine speed climb, as authorized for the engine in said aerodyne;
   and varying the speed of the engine by progressively decreasing the speed of the engine from the greater than maximum authorized engine speed as the altitude of the aerodyne increases.

2. The method of claim 1, wherein the step of varying the velocity of the aerodyne includes the steps of increasing the velocity of the aerodyne and then decreasing the velocity of the aerodyne with the increase in altitude of the aerodyne.

3. The method of claim 1, wherein the steps of varying the velocity of the aerodyne and varying the speed of the engine are varied as a function of minimizing the sum of fuel costs, flight duration costs, and engine maintenance costs.

4. The method of claim 1, wherein the steps of varying the velocity of the aerodyne and varying the speed of the engine are varied as a function of time during the climb from a damage curve giving cost per time unit under given engine operating conditions.

5. A method of piloting an engine aerodyne in the climb phase having adjustable velocity and adjustable engine speed, comprising changing said velocity of said aerodyne according to altitude thereof, based on a first variation law as well as changing said engine speed, based on a second variation law corresponding substantially to progressive decrease in such engine speed as altitude increases, said engine speed, at least for a portion of the climb, remaining higher than maximum authorized engine speed for a constant engine speed climb, said laws imposed upon velocity and engine speed as functions of the altitute being defined so as to minimize the exploitation costs of the aerodyne during the climb, the first variation velocity and the second variation speed laws being defined so as to minimize the sum of the fuel costs, the flight duration costs and the engine maintenance costs.

6. A method according to claim 5, wherein the maintenance cost is defined as the integral, as a function of time during the climb, of a damage curve giving a cost per time unit under given engine operating conditions.

7. A method according to claim 5, wherein the variation laws imposed upon velocity and engine speed are redefined at least once during the climb mainly as a function of the external environmental parameters.

* * * * *